| United States Patent [19] | [11] Patent Number: 4,841,008 |
| Tsukamoto et al. | [45] Date of Patent: Jun. 20, 1989 |

[54] COATING COMPOSITIONS

[75] Inventors: Takashi Tsukamoto, Suita; Toyoji Hatta, Ikeda; Ichiro Minato, Kobe, all of Japan

[73] Assignee: Takeda Chemical Industries, Ltd., Osaka, Japan

[21] Appl. No.: 228,317

[22] Filed: Aug. 4, 1988

[30] Foreign Application Priority Data

Aug. 11, 1987 [JP] Japan .................. 62-201407
Aug. 11, 1987 [JP] Japan .................. 62-201408

[51] Int. Cl.$^4$ .............................................. C08G 18/80
[52] U.S. Cl. ..................................................... 528/45
[58] Field of Search ......................................... 528/45

[56] References Cited

U.S. PATENT DOCUMENTS 4,369,301 1/1983 Konig et al. ........................ 528/45

Primary Examiner—Maurice J. Welsh
Attorney, Agent, or Firm—Wenderoth, Lind & Ponack

[57] ABSTRACT

A chipping resistant polyurethane coating composition which comprises:

(a) a polyisocyanate blocked with an oxime or a lactam or a polyurethane prepolymer having terminal isocyanate groups blocked with an oxime or a lactam;

(b) a polyaminepolyetherpolyester which is a condensate of a polyaminepolyether and an organic carboxylic acid, the polyaminepolyether being an adduct of an oxirane compound to a polyamine compound, a polyamidepolyamineopolyether which is an adduct of an oxirane compound to a polyamidepolyamine, the polyamidepolyamine being a condensate of a polyamine and an organic carboxylic acid; or a mixture of the polyaminepoly-etherpolyester and the polyamidepolyaminepolyether.

The composition in which an aromatic polyisocyanate or its prepolymer blocked with an oxime is curable at temperatures of about 90°–100° C.

8 Claims, No Drawings

COATING COMPOSITIONS

This invention relates to a polyurethane coating composition, and particularly to a one-can polyurethane coating composition which provides a film flat and of excellent resistance to chipping without bubbling when being baked and cured.

It is necessary that automobile coating compositions provide a film which is not damaged by impact, or a film of the composition be of highly resistance to chipping. A one-can polyurethane coating composition has hitherto been used as such chipping resistant coating compositions. However, when conventional one-can polyurethane coating compositions are used for such purposes, thick coating is needed to form a film which is of satisfactory chipping resistance, while such thick coating causes sagging of coating, to fail to provide a flat film.

To solve the above problems, there has been proposed a coating composition composed of a polyisocyanate blocked with an oxime or a lactam and a polyaminepolyamide, as described in, for example, Japanese Patent Laid-Open No. 58-108261 and No. 58-108262. A further one-can polyurethane coating composition has been also proposed which is composed of a polyaminepolyether obtained by addition of alkylene oxides to a polyalkylenepolyamine and a polyisocyanate blocked with an oxime or a lactam, as is described in Japanese Patent Laid-Open No. 61-218664. This composition provides a film resistant to chipping to an extent, however, when the composition is baked, the coating remarkably bubbles, especially when the coating is of about 100 μm or more, to fail to form a flat film. Furthermore, the cure is insufficient when the composition is baked at temperatures of not more than about 120° C. The incorporation of much amounts of catalysts such as tertiary amines, metal salts or organometallic compounds in polyurethane coating composition will improve curability of the composition and reduce the curing temperature to less than about 120° C., but at the same time the baked film will be deteriorated shortly by the catalysts remaining in the film and thus will be undurable.

As a further problem in connection with the curing temperature, the conventional one-can polyurethane coating compositions usually need baking at high temperatures of about 140°–180° C. for about 20–40 minutes, so that the use of the conventional compositions need as much energy cost. Thus, there has been a demand for a one-can polyurethane coating composition which is curable at low temperatures, for example, at temperatures of less than about 130° C., and many investigations have been heretofore made on low temperature dissociable blocked polyisocyanates for the purpose of developing low temperature curable polyurethane coating compositions. For instance, the use of polisocyanates blocked with the alleged low temperature dissociable blocking agents such as ethyl acetoacetate or ethyl malonate has been proposed. The use of such low temperature dissociable blocked polyisocyanate as aforementioned in polyurethane coating compositions makes the curing temperature lower to an extent, however, the composition is much less storable and inferior in film quality including chipping resistance.

Therefore, it is an object of the invention to provide a one-can polyurethane coating composition which provides a film flat and of highly resistance to chipping without bubbling when being baked.

It is another object of the invention to provide a one-can polyurethane coating composition which is curable at temperatures as low as about 90°–110° C. within a short time without bubbling to provide a film flat and of highly resistance to chipping.

According to the invention, there is provided a one-can polyurethane coating composition which comprises:

(a) a polyisocyanate blocked with an oxime or a lactam, or a polyurethane prepolymer having terminal isocyanate groups blocked with an oxime or a lactam;

(b) a polyaminepolyetherpolyester which is a condensate of a polyaminepolyether and an organic carboxylic acid, the polyaminepolyether being an adduct of an oxirane compound to a polyamine compound; a polyamidepolyaminepolyether which is an adduct of an oxirane compound to a polyamidepolyamine, the polyamidepolyamine being a condensate of a polyamine and an organic carboxylic acid; or a mixture of the polyaminepolyetherpolyester and the polyamidepolyaminepolyether.

The blocked polyisocyanate is in general an adduct of a polyisocyanate and a blocking agent, which adds to free isocyanate groups of the polyisocyanate, to form the adduct to make the isocyanate groups inactive, but readily dissociates from the isocyanate groups to regenerate free isocyanate groups when the adduct is heated to elevated temperatures, and/or put into contact with catalysts. The blocked polyisocyanate is already known as described in, for example, Japanese Patent Laid-Open (Unexamined) No. 60-203685.

The blocked polyisocyanate used in the invention is a polyisocyanate blocked with an oxime or a lactam.

Any polyisocyanate is usable to form the blocked polyisocyanate, and thus the polyisocyanate includes, for example, aromatic, aliphatic, aromatic-aliphatic and alicyclic polyisocyanates. The aromatic polyisocyanate includes 1,3-phenylene diisocyanate, 1,4-phenylene diisocyanate, 4,4'-diphenyldiisocyanate, 4,4'-diphenylmethane diisocyanate, 2,4-tolylene diisocyanate, 2,6-tolylene diisocyanate, 4,4'-toluidine diisocyanate, dianisidine diisocyanate, 4,4'-diphenylether diisocyanate, 4,4',4''-triphenylmethane triisocyanate, 1,3,5-triisocyanatobenzene and 2,4,6-triisocyanatotoluene. The aliphatic polyisocyanate includes trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, 2,4,4- or 2,2,4-trimethylhexamethylene diisocyanate and methyl 2,6-diisocyanatocaproate. The aromatic-aliphatic polyisocyanate includes ω,ω'-diisocyanato-1,3-dimethylbenzene, ω,ω'-diisocyanato-1,4-dimethylbenzene, ω,ω'-diisocyanato-1,4-diethylbenzene, 1,3-tetramethylxylylene diisocyanate and 1,4-tetramethylxylylene diisocyanate. The alicyclic polyisocyanate includes 1,3-cyclopentane diisocyanate, 1,4-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis-(cyclohexylisocyanate), methyl-2,4-cyclohexane diisocyanate, methyl-2,6-cyclohexane diisocyanate, 1,4-bis(isocyanatomethyl)cyclohexane and 1,3-bis(isocyanatomethyl)cyclohexane. These polyisocyanates may be used singly or as a mixture.

Other polyisocyanates are also usable to form the blocked polyisocyanate, such as polymeric polyisocyanates, e.g., dimers or trimers of the diisocyanates as above-mentioned, polymethylene polyphenylene polyisocyanates, or modified derivatives such as with carbondiimide.

The polyurethane prepolymer used in the invention has terminal isocyanate groups in the molecule, and is obtained by the reaction of a polyisocyanate such as above-mentioned with a polyhydric alcohol or a polyol in such a manner that the isocyanate groups of the polyisocyanate is more than the hydroxyls of the polyhydric alcohol or polyol, with preferred isocyanate/hydroxyl equivalent ratios of about 1.2–5.0.

The polyol used has at least two reactive hydrogen in the molecule, and has a molecular weight preferably in the range of 62–100000. The polyol used includes, for example, polyesterpolyols, polyetherpolyols, polyetheresterpolyols, polyesteramidepolyols, acrylic polyols, polyurethanepolyols, polycarbonatepolyols, epoxy polyols, epoxy-modified polyols, polyhydroxylalkanes, alkyd-modified polyols, castor oil, and mixtures of these.

The production of polyurethane prepolymers using polyols and polyisocyanates such as above described are well known in the art. By way of example, a polyol and a polyisocyanate is reacted usually at temperatures of about 0°–200° C. either in the presence or absence of a solvent. If desired, any known catalyst, such as tertiary amines, metal salts or organometallic compounds, is used.

A varierty of polyesterpolyols are usable for the production of prepolymers, however, reaction products of polyhydric alcohols and polybasic carboxylic acids are preferred.

There may be used as a polyhydric alcohol, ethylene glycol, propylene glycol, butylene glycol, hexylene glycol, neopentyl glycol, cyclohexanedimethanol, diethylene glycol, triethylene glycol, polyoxyethylene glycol, dipropylene glycol, polyoxypropylene glycol, polyoxybutylene glycol, glycerine, trimethylolpropane, hexanetriol, pentaerythritol or sorbitan.

There may be used as a polybasic carboxylic acid, for example, succinic acid, adipic acid, azelaic acid, sebacic acid, phthalic acid, isophthalic acid, terephthalic acid, tetrahydrophthalic acid, hexahydrophthalic acid, maleic acid, fumaric acid. Acid anhydrides of these polybasic carboxylic acids are also usable. Polyester polyols as obtained by ring-opening polymerization of lactones such as caprolactone or methylcaprolactone with a glycol initiator are also usable.

The polyetherpolyol may be obtained by addition polymerization of epoxide compounds such as α-olefin oxides or alkylene oxides (e.g., ethylene oxide, propylene oxide, butylene oxide); aromatic epoxide compounds such as styrene oxide; glycidyl compounds such as epichlorohydrin, phenyl glycidyl ether or allyl glycidyl ether; or cycloalkylene ethers such as tetrahydrofuran, with an initiator compound having a reactive hydrogen in the molecule in the presence of a catalyst such as boron trifluoride. The above-mentioned monomeric compounds are used singly or as a mixture of two or more. When the latter is used, the resultant polyetherpolyol may be either random or alternate addition polymers.

There may be used as the initiator compound having a reactive hydrogen, for example, water, polyols as before described, such as ethylene glycol, propylene glycol, glycerine, trimethylolpropane, pentaerythritol or sorbitol; alkanolamines such as ethanolamine, propanolamine; or polyamines among which are preferred (poly)alkylenepolyamines such as ethylenediamine or diethylenetriamine.

The polyetheresterpolyol may be obtained by esterfication, for example, of the aforesaid polyetherpolyol with polybasic carboxylic acids, or also by ring-opening copolymerization of epoxide compounds as previously described with acid anhydrides. The thus obtained polyetheresterpolyol has both of polyether segments and polyester segments.

The polyesteramidepolyol may be obtained by esterfication of polyetherpolyol as previously described with polybasic carboxylic acids in the presence of amino compounds preferred examples of which include diamines such as ethylenediamine, propylenediamine, hexamethylenediamine, xylylenediamine and hydrogenated xylylenediamine; and alkanolamines such as ethanolamine or propanolamine.

The acrylic polyol is herein defined as a copolymer which is obtained by copolymerization of polymerizable monomers having at least one hydroxyl in the molecule with comonomers copolymerizable therewith. As examples of the monomer having at least one hydroxyl in the molecule, there may be mentioned hydroxyalkyl acrylates and methacrylates such as hydroxyethyl acrylate, hydroxypropyl acrylate, hydroxybutyl acrylate, acrylic acid monoester with trimethylolpropane, methacrylates corresponding to the above, polyhydroxyl maleates and fumarates. The comonomer used includes, for example, acrylic acid; alkyl acrylates such as methyl acrylate, ethyl acrylate, propyl acrylate, butyl acrylate or 2-ethylhexyl acrylate; methacrylic acid; alkyl methacrylates such as methyl methacrylate, ethyl methacrylate, propyl methacrylate, butyl methacrylate or 2-ethylhexyl methacrylate; and vinyl monomers such as maleic acid, fumaric acid, itaconic acid, alkyl esters of these; aromatic vinyl compounds such as styrene or α-methylstyrene, vinyl acetate, acrylonitrile or methacrylonitrile.

As an example of the polyurethanepolyol, there may be mentioned a reaction product of a polyol and a polyisocyanate having terminal hydroxyls in the molecule.

There may be used as a polyol, for example, ethylene glycol, propylene glycol, butylene glycol, hexylene glycol, neopentyl glycol, cyclohexanedimethanol, diethylene glycol, triethylene glycol, polyoxyethylene glycol, dipropylene glycol, polyoxypropylene glycol, polyoxybutylene glycol, glycerine, trimethylolpropane, pentaerythritol or sorbitan. In addition to these, there may be also used polymeric polyols such as the aforesaid polyesterpolyols, polyetherpolyols, polyesteretherpolyols or polyesteramidepolyols.

The polyisocyanate used in the production of the polyurethanepolyol may be the same as before described, and thus includes aromatic polyisocyanates such as 1,3-phenylene diisocyanate, 1,4-phenylene diisocyanate, 4,4'-diphenyldiisocyanate, 4,4'-diphenylmethane diisocyanate, 2,4-tolylene diisocyanate, 2,6-tolylene diisocyanate, 4,4'-toluidine diisocyanate, dianisidine diisocyanate, 4,4'-diphenylether diisocyanate, 4,4',4''-triphenylmethane triisocyanate, 1,3,5-triisocyanatobenzene and 2,4,6-triisocyanatotoluene; and aliphatic polyisocyanates such as trimethylene diisocyanate, tetramethylene diisocyanante, hexamethylene diisocyanate, pentamethylene diisocyanate, 1,2-propylene diisocyanate, 2,3-butylene diisocyanate, 1,3- butylene diisocyanate, 2,4,4- or 2,2,4-trimethylhexamethylene diisocyanate and methyl 2,6-diisocyanatocaproate.

There may also be used aromatic-aliphatic polyisocyanates such as ω,ω'-diisocyanato-1,3-dimethylbenzene, ω,ω'-diisocyanato-1,4-dimethylbenzene, ω,ω'-diisocyanato1,4-diethylbenzene, 1,3-tetramethylxylylene diisocyanate or 1,4-tetramethylxylylene diisocyanate; or alicyclic polyisocyanates such as 1,3-cyclopentanediisocyanate, 1,4-cyclopentanediisocyanate, 1,4-cyclohexanediisocyanate, 1,3-cyclohexanediisocyanate, 3-isocyanatomethyl-3,5,5-trimethylcyclohexylisocyanate, 4,4'-methylenebis(cyclohexylisocyanate), methyl-2,4-cyclohexanediisocyanate, methyl-2,6cyclohexanediisocyanate, 1,4-bis(isocyanatomethyl)cyclohexane or 1,3-bis(isocyanatomethyl)cyclohexane. These compounds may be used singly or as a mixture.

Other polyisocyanates are also usable, such as polymeric polyisocyanates, e.g., dimers or trimers of diisocyanates, polymethylene polyphenylene polyisocyanates, or modified derivatives such as with carbondiimide.

The polyol may be in part displaced by polyamine compounds, such as ethylenediamine, propylenediamine, hexamethylenediamine, bis(aminomethyl)cyclohexane or 3-aminomethyl-3,5,5-trimethylcyclohexylamine; or alkanolamines such as ethanolamine or propanolamine, in the production of the polyurethanepolyols.

The epoxy polyol used is, for example, a condensed epoxy resin which is obtained by the reaction of a polyphenolic compound or its nuclei hydrogenated compound and epichlorohydrin. Further, an epoxyester resin obtained by the reaction of a fatty acid with an epoxy resin or a modified epoxy resin obtained by the reaction of an epoxy resin with an alkanolamine are also usable.

The polyhydroxyalkane used includes, for example, saponified products of polyvinyl acetate or a copolymer of vinyl acetate with an ethylenically unsaturated comonomer such as ethylene, vinyl chloride, acrylic acid esters, or the like; or polybutadiene polyols.

The foregoing description of the polyols refers mainly to relatively high molecular weight compounds or polymers, however, the polyols used may be compounds of relatively low molecular weight of from 62 to about 400. A mixture of high molecular weight compounds or polymers and relatively low molecular weight compounds may also be used as a polyol. As examples of such relatively low molecular weight compounds, there may be mentioned, for example, ethylene glycol, propylene glycol, butylene glycol, hexylene glycol, neopentyl glycol, cyclohexanedimethanol, diethylene glycol, triethylene glycol, dipropylene glycol, glycerine, trimethylolpropane pentaerythritol or sorbitan.

The coating composition of the invention contains a blocked polyisocyanate of which isocyanate groups are blocked with an oxime or a lactam, or a blocked polyurethane prepolymer having terminal isocyanate groups blocks with an oxime or a lactam.

The oxime used includes, for example, formaldoxime, acetaldoxime, acetoxime, methyl ethyl ketoxime, methyl isopropyl ketoxime, methyl butyl ketoxime, diethyl ketoxime, diacetyl monooxime, cyclohexanone oxime, benzophenone oxime and the like. Among these oximes, methyl ethyl ketoxime and cyclohexanone oxime are particularly preferred. The lactam used includes, for example, δ-valerolactam, γ-butyrolactam, ε-caprolactam and β-propiolactam, and among these is preferred ε-caprolactam. However, a mixture of two or more of these oximes and/or lactams may be used, if necessary.

The blocked polyisocyanate or polyurethane prepolymer used in the invention is obtained by reacting a polyisocyanate or a polyurethane prepolymer with a blocking agent in the conventional manner. The reaction may be carried out either in a solvent which has no active hydrogen or in the absence of a solvent. The solvent having no active hydrogen is exemplified by esters such as ethyl acetate, butyl acetate, cellosolve acetate, carbitol acetate or dimethylesters of dibasic acids; ketones such as methyl ethyl ketone, methyl isobutyl ketone or cyclohexanone; and aromatic hydrocarbons such as toluene, xylene, Solvesso #100 or Solvesso 190 150.

When necessary, a known catalyst may be used in the blocking reaction. The catalyst includes, for example, tertiary amines and organotin compounds such as dibutyltin dilaurate, dibutyltin oxide, dibutyltin dichloride or tetrabutyl 1,3-diacetoxydistannoxane. The reaction temperature is usually in the range of about 30°–200° C. After the polyisocyanate or prepolymer has been completely blocked, the blocked polyisocyanate or prepolymer may be diluted with a solvent having active hydrogen in the molecule.

The coating composition of the invention contains a polyaminepolyetherpolyester, a polyamidepolyetherpolyester or a mixture of these, in addition to the above-mentioned blocked polyisocyanate or prepolymer.

The polyaminepolyetherpolyester will be first described. The polyaminepolyetherpolyester is a condensate of a polyaminepolyether and an organic carboxylic acid, the polyaminepoly-ether being an adduct of an oxirane compound to a polyamine compound. The polyaminepolyetherpolyester is prepared by first adding an epoxide compound or tetrahydrofuran to a polyamine compound, to provide a polyaminepolyether, and then reacting an organic carboxylic acid with the polyaminepolyether in such a manner that the hydroxyls are more than the carboxyls. The resultant polyaminepolyetherpolyester therefore has primary and/or secondary hydroxyls in the molecule.

The polyamine compound used in the preparation of the polyaminepolyetherpolyester is an aliphatic, aromatic, aromatic-aliphatic or alicyclic compound having at least two primary or second amino groups therein, and may be exemplified by, for example, alkylenediamines or polyalkylenepolyamines, such as ethylenediamine, diethylenetriamine, triethylenetetramine, tetraethylenepentamine, pentaethylenehexamine or hexamethylenediamine; or aromatic or alicyclic diamines such as phenylenediamines, tolylenediamines, xylylenediamine, 4,4'-methylenebis(cyclohexylamine), 3-aminomethyl-3,5,5-trimethylcyclohexylamine, bis(aminomethyl)cyclohexane or 1-methyl-2,4-diaminocyclohexane, among these are preferred aliphatic or alicyclic diamines.

In turn, the oxirane compound used includes for example, α-olefin oxides or alkylene oxides (e.g., ethylene oxide, propylene oxide, butylene oxide and the like); aromatic epoxide compounds such as styrene oxide or a α-methylstyrene oxide; and glycidyl compounds such as epichlorohydrin, phenyl glycidyl ether or allyl glycidyl ether, among which are preferred α-olefin oxides.

The ring-opening addition polymerization of the oxirane compounds or tetrahydrofuran using the polyamine compound as an initiator compound provides the polyaminepolyether, and the reaction of the polyaminepolyether with an organic carboxylic acid provides the polyaminepolyetherpolyester. There may be used a monobasic or polybasic carboxylic acid as the above organic carboxylic acid. The monobasic carboxylic acid used includes, for example, caproic acid, capryric acid, lauric acid, tridecylic acid, mirystic acid, palmitic acid, stearic acid and behenic acid, and the polybasic carboxylic acid used includes, for example, adipic acid, azelaic acid, sebacic acid, dodecanedioic acid, dimer acid, and the like.

The reaction of the polyaminepolyether with the organic carboxylic acid may be carried out in a conventional manner, for example, at temperatures of about 150°–220° C. while condensation water generated are removed from the reaction mixture. An organic acid or inorganic acid may be used as a catalyst, if desired.

Secondly, the polyamidepolyaminepolyether is an adduct of an oxirane compound to a polyamidepolyamine, the polyamidepolyamine being a condensate of a polyamine and an organic carboxylic acid. The polyamidepolyaminepolyether is prepared by first condensing the polyamine compound as previously described with the organic carboxylic acid as previously described in such a manner that the amino groups are more than the carboxyls, to provide an polyaminepolyamine, and the adding the oxirane compounds as previously described or tetrahydrofuran to the polyamidepolyamine. The thus obtained polyamidepolyaminepolyether has primary and/or secondary hydroxyls in the molecule.

More specifically, by way of example, the organic carboxylic acid and the polyamine compound are mixed together, and heated at temperatures of about 150°–220° C. while the condensation water produced is removed therefrom, to first give an polyamidepolyamine, and then the epoxide compound or tetrahydrofuran is reacted with the polyamidepolymine, to provide the polyamidepolyaminepolyether.

The coating composition of the invention contains the blocked polyisocyanate or polyurethane prepolymer and, either the polyaminepolyetherpolyester, polyamidepolyaminepolyether or a mixture of these in equivalent ratios of the blocked polyisocyanate groups to the reactive hydrogens in the polyaminepolyetherpolyester or polyamidepolyaminepolyether used of about 0.1 to 10, preferably of about 0.2 to 5, most preferably of about 0.4 to 2. The coating composition may further contain a curing agent and other additives, if desired.

The coating composition of the invention as above set forth may be used as it is as a chipping resistant coating composition, however, it is preferred that the composition be compounded together with pigments, dyes, leveling agents, sagging resistant agents, catalysts, stabilizers and the like to be of more resistance to chipping.

The compounding may be carried out by admixing the resin components composed of the blocked polyisocyanate or polyurethane prepolymer, and the polyaminepolyetherpolyester, polyamidepolyaminepolyether or a mixture of these, and pigments, e.g., calcium carbonate, titanium white, carbon black and the like, and further if necessary, together with catalysts, thixotropic agents such as finely divided anhydrous silica, e.g., Aerosil (trademark, by Degussa, West Germany), preferably in an appropriate solvent.

The use of a solvent is advantageous for easy treating of the blocked polyisocyanate or prepolymer, and the polyaminepolyetherpolyester or polyamidepolyaminepolyether, and also for assuring high dispersibility of all the ingredients in the composition upon compounding. The solvent is selected so that it is properly evaporated when the composition is baked, and the amount of the solvent used is selected so that the resultant composition has a suitable viscosity when being applied onto a substrate.

There may be used as such solvents, for example, aliphatic, alicyclic or aromatic hydrocarbons, ketones, esters and ethers which have no reactive hydrogens in the molecule. More specifically, there may be used, for example, aliphatic hydrocarbons of 6–20 carbons such as n-hexane, heptane, octane, nonane, decane; alicyclic hydrocarbons such as cyclohexane, methylcyclohexane; aromatic hydrocarbons such as benzene, alkylbenzenes such as toluene, xylene, ethylbenzene, polynuclear aromatic hydrocarbons such as naphthalene or their derivatives, or commercially available hydrocarbon solvents having boiling temperatures of about 100°–300° C. derived from petroleum fractions.

As examples of ketones, there may be used, for example, aliphatic ketones such as acetone, methyl ethyl ketone or methyl isobutyl ketone; or aromatic ketones such as benzophenone. The ketones of 3–15 carbons are preferred. There may be mentioned as examples of esters, for example, alkyl acetates such as methyl acetate, ethyl acetate, butyl acetate, amyl acetate or 2-ethylhexyl acetate; and ether acetates of gylcols such as ethylene glycol, propylene glycol, diethylene glycol and the like, for example, ethylene glycol methyl ether acetate, diethylene glycol methyl ether acetate, propylene glycol methyl ether acetate and ethylene glycol butyl ether acetate. Commercially available mixed ester solvents such as DBE (by Dupont) are also usable. The solvents may be used singly or as a mixture.

Nitrogen- or sulfur-containing solvents may also be used in addition to the above exemplified solvents. Further, alcohols or glycol ethers such as methanol, ethanol, propanol, butanol, 2-ethylhexanol, methyl cellosolve, butyl cellosolve, propylene glycol dimethyl ether, propylene glycol diethyl ether or propylene glycol dibutyl ether may also be used as a solvent within such an amount as not to adversely affect the properties of the resultant film of the coating composition.

As previously described, lactams or oximes are used as a blocking agent, but these blocking agents are also usable as a solvent within a limit.

The solvent is contained in the compounded coating composition usually in amounts of not more than about 50% by weight, however, may be contained in amounts of more than about 50% by weight, if desired.

The coating composition of the invention, either as it is or after compounded, is usually applied in a thickness of about 20–500 μm (after baking) to a substrate with an air spray or airless spray, and the baking of the coating provides flat and chipping resistant film. The baking temperature is usually in the range of about 100°–170° C.

Further according to the invention, the polyaminepolyetherpolyester or polyamidepolyaminepolyether in the composition may be in part displaced by an adduct of alkylene oxides to a polyalkylenepolyamine in amounts preferably of not more than about 99% by weight, more preferably of not more than about 95% by weight, based on the polyaminepoly-etherpolyester or polyamidepolyaminepolyether used in the composition. This coating composition also provides flat and chipping resistant film after baking.

The above-mentioned adduct of alkylene oxides to a polyalkylenepolyamine is the polyaminepolyether which has been hereinbefore described in connection with the production of the polyaminepolyetherpolyester, and may be prepared by ringopening addition polymerization of the epoxide compounds as already described or tetrahydrofuran, preferably α-olefin oxides or alkylene oxides, using the polyamine compounds as hereinbefore described as an initiator. Preferably the polyaminepolyether prepared by the reactions of a (poly)alkylenepolyamine such as ethylenediamine, diethylenetriamine, triethylenetetramine, tetraethylenepentamine, pentaethylenehexamine or hexamethylenediamine with an α-olefin oxide such as ethylene oxide or propylene oxide is used.

In general, compounded coating compositions have a high viscosity and moreover they are tixotropic, so that they are apt to produce bubbles, when, for example, being applied with an airless spray since the bubbles are not readily escapable from the coating. However, the coating composition of the invention, either as it is or after compounding, produces no bubbles in the coating when being applied to a substrate and baked, thus providing flat film which is of highly resistance to chipping.

As set forth, the coating composition of the invention is capable of being applied thickly on a substrate since it produces no bubbles in the coating after baking, and thus provides film of satisfactory chipping resistance.

As a further aspect of the invention, there is provided a one-part polyurethane coating composition which is completely cured by low temperature baking without bubbling, to provide a flat film of excellent chipping resistance.

The composition comprises:

(a) an aromatic polyisocyanate blocked with an oxime or an aromatic polyurethane prepolymer having terminal isocyanate groups blocked with an oxime;

(b) a polyaminepolyetherpolyester which is a condensate of a polyaminepolyether and an organic carboxylic acid, the polyaminepolyether being an adduct of ethylene oxide or tetrahydrofuran to a polyamine compound; a polyamidepolyaminepolyether which is an adduct of ethylene oxide or tetrahydrofuran to a polyamidepolyamine, the polyamidepolyamine being a condensate of a polyamine and an organic carboxylic acid; or a mixture of the polyaminepolyetherpolyester and the polyamidepolyaminepolyether.

The aromatic polyisocyanates or aromatic polyurethane prepolymer having terminal isocyanate groups are already described hereinbefore. There may be used such oximes as hereinbefore described, among which are preferred acetoxime, methyl ethyl ketoxime, methyl isobutyl ketoxime and cyclohexanone oxime. A mixture of two or more of these oximes may be used. The use of lactams as a blocking agent must be avoided when low temperature curable polyurethane coating composition is to be obtained.

The polyaminepolyetherpolyester used is prepared by first adding an ethylene oxide or tetrahydrofuran to a polyamine compound, to provide a polyaminepolyether, and then reacting an organic carboxylic acid with the polyaminepolyether in such a manner that the hydroxyls are more than the carboxyls in the same manner as hereinbefore described. The polyamine compound and the organic carboxylic acid used are the same as hereinbefore described. The resultant polyaminepolyetherpolyester therefore has primary hydroxyls in the molecule.

In turn, the polyamidepolyaminepolyether used is prepared by first condensing the polyamine compound as previously described with the organic carboxylic acid as previously described in such a manner that the amino groups are more than the carboxyls, to provide an polyamidepolyamine, and then adding ethylene oxide or tetrahydrofuran to the polyamidepolyamine in the same manner as hereinbefore described. The thus obtained polyamidepolyaminepolyether has primary hydroxyls in the molecule.

The coating composition of the invention contains the blocked polyisocyanate or polyurethane prepolymer and, either the polyaminepolyetherpolyester, polyamidepolyaminepolyether or a mixture of these in equivalent ratios of the blocked polyisocyanate groups to the reactive hydrogens in the polyaminepolyetherpolyester or polyamidepolyaminepolyether used of about 0.1 to 10, preferably of about 0.2 to 5, most preferably of about 0.4 to 2. The coating composition may further contain a curing agent and other additives, and is preferably coumpounded in the same manner as hereinbefore desribed.

The composition is curable by baking at temperatures as low as about 90°–110° C. for 10–20 minutes without bubbling, to provide a flat film of excellent chipping resistance.

The invention is now described with reference to examples, which however are not to be construed as limiting of the invention.

EXAMPLE 1

An amount of 262.4 g of 4,4'-methylenebis(cyclohexylisocyanate), 200 g of polypropylene glycol of molecular weigh of about 1000 and 26.8 g of trimethylolpropane were reacted in 578 g of an ester solvent DBE (by Dupont) in the presence of 0.1 g of tetrabutyl 1,3-diacetoxydistannoxane at temperatures of 80° C. for 2 hours.

There were dropwise added to the reaction mixture an amount of 88.8 g of methyl ethyl ketoxime, to provide a blocked polyisocyanate solution of a regenerative isocyanate content of 3.63% by weight and a solid content of 50% by weight.

Meanwhile an amount of 292 g of an adduct of propylene oxide to ethylenediamine (hydroxyl value of 768.5) and 289 g of a polymerized vegetable fatty acid (Versadyme 216 by Henkel-Hakusui K. K., Japan) were reacted at temperatures of about 180°–220° C. until the generation of condensation water ceased while the condensation water was removed with nitrogen from the reaction mixture. After the reaction, Solvesso #100 was added to the reaction mixture, to provide a polyaminepolyetherpolyester solution of a hydroxyl value of 79.3 and a solid content of 60% by weight.

An amount of 1387 g of the above blocked polyisocyanate solution, 313 g of the above polyaminepolyetherpolyester solution, 1300 g of calcium carbonate, 70 g of titanium white, 35 g of Aerosil, 1 g of carbon black and 400 g of the solvent DBE were mixed together, to provide a coating composition.

The composition was applied in a thickness of 200 μm (after baking) onto a substrate, and then baked at 140° C. for 20 minutes, to provide a cured film. As the properties of the film are shown in Table 1, the film was found to be of highly chipping resistance.

EXAMPLE 2

An amount of 250 g of 4,4'-diphenylmethane diisocyanate, 312.5 g of polycaprolactonediol of molecular weight of about 1250, 9.0 g of 1,4-butanediol and 13.4 g of trimethylolpropane were reacted in a mixture of 350 g of cellosolve acetate and 350 g of DBE in the presence of 0.1 g of tetrabutyl 1,3-diacetoxydistannoxane at a temperature of 80° C. for 2 hours.

There were then added to the reaction mixture an amount of 115.5 g of ε-caprolactam dropwise, to provide a blocked polyisocyanate solution containing regenerative isocyanate groups in amounts of 3.0% by weight and of a solid content of 50% by weight.

Meanwhile an amount of 494.7 g of an adduct of propylene oxide to triethylenetramine (hydroxyl value of 680.4) and 200.3 g of lauric acid were reacted at temperatures of about 180°-220° C. until the generation of condensation water ceased while the condensation water was removed with nitrogen from the reaction mixture. After the reaction, DBE was added to the reaction mixture, to provide a polyaminepolyetherpolyester solution of a hydroxyl value of 248.6 and a solid control content of 60% by weight.

An amount of 1401 g of the above blocked polyisocyanate solution, 226 g of the polyaminepolyetherpolyester solution, 1000 g of calcium carbonate, 200 g of talc, 70 g of titanium white, 35 g of Aerosil, 1 g of carbon black and 360 g of cellosolve acetate were mixed together, to provide a coating composition.

The composition was applied in a thickness of 200 μm (after baking) onto a substrate, and then baked at 150° C. for 20 minutes, to provide a cured film. As the properties of the film are shown in Table 1, the film was found to be of highly chipping resistance.

EXAMPLE 3

An amount of 174.2 g of tolylene diisocyanate (2,4- and 2,6-isomers ratio of 80/20), 150 g of polytetramethyleneether glycol of molecular weight of about 1000, 65 g of polytetramethyleneether glycol of molecular weight of about 650 and 22.4 g of trimethylolpropane were reacted in 527 g of Solvesso #150 in the presence of 0.1 g of tetrabutyl 1,3-diacetoxydistannoxane at a temperature of 80° C. for 2 hours.

There were then gradully added to the reaction mixture an amount of 115.5 g of ε-caprolactam, to provide a blocked polyisocyanate solution containing regenerative isocyanate content in amounts of 3.98% by weight and of a solid content of 50% by weight.

Meanwhile an amount of 584 g of an adduct of propylene oxide to ethylenediamine (hydroxyl value of 768.5) and 177.3 g of a higher dibasic carboxylic acid mixture (ULB-20 by Okamura Seiyu K. K., Japan) were reacted at temperatures of about 180°-220° C. until the generation of condensation water ceased while the condensation water was removed with nitrogen from the reaction mixture. After the reaction, 300 g of Solvesso #150 was added to the reaction mixture, to provide a polyaminepolyetherpolyester solution of a hydroxyl value of 316.9 and a solid content of 60% by weight.

An amount of 1054 g of the above blocked polyisocyanate solution, 177 g of the polyaminepolyetherpolyester solution, 800 g of calcium carbonate, 150 g of talc, 50 g of titanium white, 25 g of Aerosil and 300 g of Solvesso #150 were mixed together, to provide a coating composition.

The composition was applied in a thickness of 200 μm (after baking) onto a substrate, and then baked at 150° C. for 20 minutes, to provide a cured film. As the properties of the film are shown in Table 1, the film was found to be of highly chipping resistance.

EXAMPLE 4

An amount of 73 g of adipic acid and 104 g of diethylenetriamine were reacted in a reaction vessel at temperatures of about 180°-220° C. until the generation of condensation water ceased while the condensation water was removed with nitrogen from the reaction mixture. Then the reaction mixture was cooled to 100°-120° C., and then propylene oxide was fed into the reaction vessel until the inside pressure reached 2 kg/cm$^2$, followed by the reaction at 100°-120° C. for 3 hours. After the reaction, 104 g of cellosolve acetate was added to the reaction mixture, to provide a polyamidepolyaminepolyether solution of a hydroxyl value of 344.9 and a solid content of 60% by weight.

An amount of 1054 g of the blocked polyisocyanate solution prepared in Example 3 and 179 g of the polyamidepolyaminepolyester solution, 1000 g of calcium carbonate, 60 g of titanium white, 30 g of Aerosil, 1 g of carbon black and 370 g of Solvesso #150 were mixed together, to provide a coating composition.

The composition was applied in a thickness of 200 μm (after baking) onto a substrate, and then baked at 150° C. for 20 minutes, to provide a cured film. As the properties of the film are shown in Table 1, the film was found to be of highly chipping resistance.

EXAMPLE 5

An amount of 168.2 g of hexamethylenediisocyanate, 250 g of polybutylene adipate of molecular weight of about 1000 and 52 g of trifunctional polycaprolactone (Placcel 303 by Daicel Kagaku Kogyo K. K., Japan) were reacted in 559 g of carbitol acetate in the presence of 0.1 g of tetrabutyl 1,3-diacetoxydistannoxane at a temperature of 80° C. for 2 hours.

There were then dropwise added to the reaction mixture an amount of 88.8 g of methyl ethyl ketoxime, to provide a blocked polyisocyanate solution of a regenerative isocyanate content of 3.76% by weight and a solid content of 50% by weight.

Meanwhile an amount of 1586 g of a coadduct of ethylene oxide/propylene oxide to ethylenediamine (ethylene oxide/ propylene oxide molar ratio of 1/1, hydroxyl value of 850) and 289 g of a dimeric acid, Versadyme (registered trademark, by Henkel) 216 were reacted at temperatures of about 180°-220° C. until the generation of condensation water ceased while the condensation water was removed with nitrogen from the reaction mixture. After the reaction, butyl acetate was added to the reaction mixture, to provide a polyaminepolyetherpolyester solution of a hydroxyl value of 417 and a solid content of 60% by weight.

An amount of 1118 g of the above blocked polyisocyanate solution, 135 g of the polyaminepolyetherpolyester solution, 1000 g of calcium carbonate, 50 g of titanium white, 1 g of carbon black and 25 g of a thixotropic agent (Dispalon 3600N by Kusumoto Kasei K. K., Japan) were added to 350 g of Solvesso #100, to provide a coating composition.

The composition was applied in a thickness of 200 μm (after baking) onto a substrate, and then baked at 160° C. for 30 minutes, to provide a cured film. As the properties of the film are shown in Table 1, the film was found to be of highly chipping resistance.

EXAMPLE 6

An amount of 222.2 g of 3-isocyanatomethyl-3,5,5-trimethylcyclohexylisocyanate, 204 g of purified castor oil, 9 g of 1,4-butanediol and 9 g of trimethylolpropane were reacted in DBE in the presence of 0.1 g of dimethyltin laurate at a temperature of 80° C. for 2 hours.

There were then dropwise added to the reaction mixture an amount of 88.8 g of methyl ethyl keyoxime, to provide a blocked polyisocyanate solution of a regenerative isocyanate content of 3.94% by weight and a solid content of 50% by weight.

Meanwhile an amount of 937 g of an adduct of ethylene oxide to xylylenediamine (hydroxyl value of 720) and 287 g of a dimeric acid, Versadyme (registered trademark, by Henkel) 288 were reacted at temperatures of about 180°–220° C. until the generation of condensation water ceased while the condensation water was removed with nitrogen from the reaction mixture. After the reaction, methyl isobutyl ketone was added to the reaction mixture, to provide a polyaminepolyetherpolyester solution of a hydroxyl value of 307 and a solid content of 60% by weight.

An amount of 1066 g of above the blocked polyisocyanate solution, 182 g of the polyaminepolyetherpolyester solution, 700 g of calcium carbonate, 300 g of talc, 50 g of titanium white and 25 g of Aerosil were added to Solvesso #100, to provide a coating composition.

The composition was applied in a thickness of 300 μm (after baking) onto a substrate, and then baked at 140° C. for 20 minutes, to provide a cured film. As the properties of the film are shown in Table 1, the film was found to be of highly chipping resistance.

COMPARATIVE EXAMPLE 1

An adduct of propylene oxide to ethylenediamine (hydroxyl value of 451.7) was diluted with Solvesso #150 to provide a solution of a solid content of 60%. An amount of 124 g of the adduct solution, 1054 g of the blocked polyisocyanate solution prepared in Example 3, 900 g of calcium carbonate, 50 g of titanium white, 25 g of Aerosil and 1 g of carbon black were added to 270 g of Solvesso #150, to provide a coating composition.

The composition was applied in a thickness of 200 μm (after baking) onto a substrate, and then baked at 150° C. for 20 minutes. Bubbles were remarkably generated in the coating and the composition failed to provide a flat film. As the properties of the film are shown in Table 1, the film was found much less resistant to chipping.

COMPARATIVE EXAMPLE 2

An adduct of ethylene oxide to diethylenetriamine (hydroxyl value of 521.1) was diluted with DBE to provide a solution of a solid content of 60%. An amount of 180 g of the adduct solution, 1156 g of the blocked polyisocyanate solution prepared in Example 1, 900 g of calcium carbonate, 50 g of titanium white, 25 g of Aerosil and 1 g of carbon black were added to 250 g of DBE, to provide a coating composition.

The composition was applied in a thickness of 200 μm (after baking) onto a substrate, and then baked at 140° C. for 20 minutes. Bubbles were remarkably generated in the coating and the composition failed to provide a flat film. As the properties of the film are shown in Table 1, the film was found much less resistant to chipping.

TABLE 1

| | | Cure Conditions | Film Appearance | Chipping Resistance |
|---|---|---|---|---|
| Example | 1 | 140° C. × 20 min. | Very good | Very good |
| | 2 | 150° C. × 20 min. | Very good | Very good |
| | 3 | 150° C. × 20 min. | Very good | Very good |
| | 4 | 150° C. × 30 min. | Very good | Very good |
| | 5 | 160° C. × 30 min. | Very good | Very good |
| | 6 | 140° C. × 20 min. | Very good | Very good |
| Comparative | 1 | 150° C. × 20 min. | Bad | No good |
| | 2 | 140° C. × 20 min. | Bad | No good |

Notes: Chipping resistance was evaluated by hitting 500 g of JIS A 5001 No. 6 crushed stones of a grain size of 5–13 μm against the film by use of a Gravel chipping test instrument (Suga Test Instuments, Japan)

EXAMPLE 7

An amount of 174.2 g of tolylene diisocyanate (2,4- and 2,6-isomers ratio of 80/20), 312.5 g of polycaprolactonediol of molecular weight of 1250 (Daicel Kagaku Kogyo K. K., Japan) and 22.4 g of trimethylolpropane were reacted in 598 g of cellosolve acetate in the presence of 0.1 g of tetrabutyl 1,3-diacetoxydistannoxane at temperatures of 80° C. for 2 hours.

There were dropwise added to the reaction mixture an amount of 88.8 g of methyl ethyl ketoxime, to provide a blocked polyisocyanate solution of a regenerative isocyanate content of 3.51% by weight and a solid content of 50% by weight.

Meanwhile an amount of 485 g of an adduct of ethylene oxide to diethylenetriamine (hydroxyl value of 868) and 289 g of a dimeric acid, Versadyme (registered trademark, by Henkel) 216 were reacted at temperatures of about 180°–220° C. until the generation of condensation water ceased while the condensation water was removed with nitrogen from the reaction mixture. After the reaction, DBE was added to the reaction mixture, to provide a polyaminepolyetherpolyester solution of a hydroxyl value of 290 and a solid content of 60% by weight.

An amount of 1196 g of the above blocked polyisocyanate solution, 194 g of the polyaminepolyetherpolyester solution, 1050 g of calcium carbonate, 60 g of titanium white, 30 g of Aerosil, 1 g of carbon black and 320 g of butyl acetate were mixed together, to provide a coating composition.

The composition was applied in a thickness of 200 μm (after baking) onto a substrate, and then baked at 110° C. for 20 minutes, to provide a cured film. As the properties of the film are shown in Table 2, the film was found to be of highly chipping resistance.

EXAMPLE 8

An amount of 251 g of 4,4'-diphenylmethanediisocyanate, 195 g of polytetramethylene glycol of molecular weight of about 650, 17.9 g of trimethylolpropane were reacted in 552 g of Solvesso #100 in the presence of 0.1 g of dibutyltin dilaurate at a temperature of 80° C. for 2 hours.

There were added gradually dropwise to the reaction mixture an amount of 88.9 g of methyl ethyl ketoxime, to provide a blocked polyisocyanate solution containing regenerative isocyanate groups in amounts of 3.8% by weight and a solid content of 50% by weight.

Meanwhile an amount of 236 g of an adduct of ethylene oxide to ethylenediamine (hydroxyl value of 950) and 177 g of the aforementioned higher diabasic acid mixtures ULB-20 (registered trademark, by Okamura Seiyu K. K., Japan) were reacted at temperatures of about 180°–220° C. until the generation of condensation water ceased while the condensation water was removed with nitrogen from the reaction mixture. After the reaction, cyclohexanone was added to the reaction mixture, to provide a polyaminepolyetherpolyester solution of a hydroxyl value of 255 and a solid content of 60% by weight.

An amount of 1324 g of the above blocked polyisocyanate solution, 220 g of the polyaminepolyetherpolyester solution, 1200 g of calcium carbonate, 60 g of titanium white, 30 g of Aerosil and 1 g of carbon black were added to 370 g of cellosolve acetate, to provide a coating composition.

The composition was applied in a thickness of 200 μm (after baking) onto a substrate, and then baked at 110° C. for 20 minutes, to provide a cured film. As the properties of the film are shown in Table 2, the film was found to be of highly chipping resistance.

EXAMPLE 9

An amount of 270 g of crude 4,4′-diphenylmethanediisocyanate (Millionate MR-200 by Nippon Polyurethane Kogyo K. K., Japan), 250 g of polyhexylene adipate of molecular weight of 1000 and 17.9 g of trimethylolpropane were reacted in 636 g of butyl acetate in the presence of 0.1 g of tetrabutyl 1,3-diacetoxydistannoxane at temperatures of 80° C. for 2 hours.

There were then dropwise added to the reaction mixture an amount of 97.7 g of methyl ethyl ketoxime, to provide a blocked polyisocyanate solution of a regenerative isocyanate content of 3.30% by weight and a solid content of 50% by weight.

Meanwhile an amount of 410 g of an adduct of ethylene oxide to triethylenetramine (hydroxyl value of 821) and 200 g of lauric acid were reacted at temperatures of about 180°–220° C. until the generation of condensation water ceased while the condensation water was removed with nitrogen from the reaction mixture. After the reaction, xylene was added to the reaction mixture, to provide a polyaminepolyetherpolyester solution of a hydroxyl value of 276 and a solid content of 60% by weight.

An amount of 1271 g of the above blocked polyisocyanate solution, 223 g of the polyaminepolyetherpolyester solution, 1000 g of calcium carbonate, 150 g of talc, 60 g of titanium white 30 g of Aerosil, 1 g of carbon black and 330 g of Solvesso #100 were mixed together, to provide a coating composition.

The composition was applied in a thickness of 200 μm (after baking) onto a substrate, and then baked at 110° C. for 20 minutes, to provide a cured film. As the properties of the film are shown in Table 2, the film was found to be of highly chipping resistance.

EXAMPLE 10

An amount of 174.2 g of tolylene diisocyanate (2,4- and 2,6-isomers ratio of 80/20), 204 g of purified castor oil, 9 g of 1,4-butanediol and 9 g of trimethylolpropane were reacted in 384 g of methyl isobutyl ketone in the presence of 0.1 g of dibutyltin laurate at temperatures of 80° C. for 2 hours.

There were then dropwise added to the reaction mixture an amount of 190.8 g of methyl ethyl ketoxime, to provide a blocked polyisocyanate solution of a regenerative isocyanate content of 4.35% by weight and a solid content of 50% by weight.

Meanwhile an amount of 288 g of Versadyme 288 and 103 g of diethylenetriamine were reacted in a reactive vessel at temperatures of about 180°–210° C. until the generation of condensation water ceased while the condensation water was removed with nitrogen from the reaction mixture. After the reaction, ethylene oxide was fed into the reaction vessel until the inside pressure reached 2 kg/cm$^2$, followed by the reaction for 3 hours. After the reaction, butyl acetate was was added to the reaction mixture, to provide a polyamidepolyaminepolyether solution of a hydroxyl value of 238 and a solid content of 60% by weight.

An amount of 967 g of the above blocked polyisocyanate solution, 238 g of the polyamidepolyaminepolyether solution, 700 g of calcium carbonate, 200 g of talc, 50 g of titanium white, 25 g of Aerosil, 1 g of carbon black and 280 g of Solvesso #100 were mixed together, to provide a coating composition.

The composition was applied in a thickness of 200 μm (after baking) onto a substrate, and then baked at 110° C. for 20 minutes, to provide a cured film. As the properties of the film are shown in Table 2, the film was found to be of highly chipping resistance.

EXAMPLE 11

A amount of 174.2 g of tolylene diisocyanate (2,4- and 2,6-isomers ratio of 65/35), 188 g of polycaprolactonediol of molecular weight of 1250 (PCL-212 by Daicel Kagaku Kogyo K. K., Japan), 97.5 g of polytetramethylene glycol of molecular weight of 650 and 17.9 g of trimethylolpropane were reacted in 566 g of xylene in the presence of 0.1 g of dibutyltin laurate at temperatures of 80° C. for 2 hours.

There were then dropwise added to the reaction mixture an amount of 88.8 g of methyl ethyl ketoxime, to provide a blocked polyisocyanate solution of a regenerative isocyanate content of 3.71% by weight and a solid content of 50% by weight.

Meanwhile an amount of 955 g of an adduct of ethylene oxide to 1,3-bisaminomethylcyclohexane (hydroxyl value of 705) and 101 g of sebacic acid were reacted at temperatures of about 180°–220° C. until the generation of condensation water ceased while the condensation water was removed with nitrogen from the reaction mixture. After the reaction, methyl isobutyl ketone was added to the reaction mixture, to provide a polyaminepolyetherpolyester solution of a hydroxyl value of 357 and a solid content of 60% by weight.

An amount of 1132 g of the above blocked polyisocyanate solution, 157 g of the polyaminepolyetherpolyester solution, 600 g of calcium carbonate, 400 g of talc, 50 g of titanium white, 25 g of Aerosil, 1 g of carbon black and 300 g of butyl acetate were mixed together, to provide a coating composition. The composition was applied in a thickness of 200 μm (after baking) onto a substrate, and then baked at 100° C. for 20 minutes, to provide a cured film. As the properties of the film are shown in Table 2, the film was found to be of highly chipping resistance.

EXAMPLE 12

An amount of 174.2 g of tolylene diisocyanate (2,4- and 2,6-isomers ratio of 65/35), 250 g of polytetramethylene glycol of molecular weight of 1000 and 22.4 g of trimethylolpropane were reacted in 326 g of cellosolve acetate in the presence of 0.1 g of tetrabutyl 1,3-diacetoxydistannoxane at temperatures of 80° C. for 2 hours.

There were then dropwise added to the reaction mixture an amount of 298.8 g of methyl ethyl ketoxime, to provide a blocked polyisocyanate solution of a regenerative isocyanate content of 3.92% by weight and a solid content of 50% by weight.

Meanwhile an amount of 473 g of an adduct of ethylene oxide to ethylenediamine (hydroxyl value of 950) and 289 g of a dimerix acid, Versadyme (registered trademark, by Henkel) 216 were reacted at temperatures of about 180°–220° C. until the generation of condensation water ceased while the condensation water was removed with nitrogen from the reaction mixture. After the reaction, DBE was added to the reaction mixture, to provide a polyaminepolyetherpolyester solution of a hydroxyl value of 317 and a solid content of 60% by weight.

An amount of 1072 g of the above blocked polyisocyanate solution, 177 g of the polyaminepolyetherpolyester solution, 1000 g of calcium carbonate, 50 g of titanium white, 25 g of Aerosil, 1 g of carbon black and 310 g of xylene were mixed together, to provide a coating composition.

The composition was applied in a thickness of 200 μm (after baking) onto a substrate, and then baked at 100° C. for 20 minutes, to provide a cured film. As the properties of the film are shown in Table 2, the film was found to be of highly chipping resistance.

TABLE 2

| | | Cure Conditions | Film Appearance | Chipping Resistance | Curability |
|---|---|---|---|---|---|
| Example | 7 | 110° C. × 20 min. | Excellent | Excellent | Excellent |
| | 8 | 110° C. × 20 min. | Excellent | Excellent | Excellent |
| | 9 | 110° C. × 20 min. | Excellent | Excellent | Excellent |
| | 10 | 110° C. × 30 min. | Excellent | Excellent | Excellent |
| | 11 | 100° C. × 30 min. | Excellent | Excellent | Excellent |
| | 12 | 100° C. × 20 min. | Excellent | Excellent | Excellent |

Notes: Chipping resistance was evaluated by hitting 500 g of JIS A 5001 No. 6 crushed stones of a grain size of 5–13 μm against the film by use of a Gravel chipping test instrument (Suga Test Instruments, Japan)

What is claimed is:

1. A polyurethane coating composition which comprises:
   (a) a polyisocyanate blocked with an oxime or a lactam; or a polyurethane prepolymer having terminal isocyanate groups blocked with an oxime or a lactam;
   (b) a polyaminepolyetherpolyester which is a condensate of a polyaminepolyether and an organic carboxylic acid, the polyaminepolyether being an adduct of an oxirane compound to a polyamine compound, a polyamidepolyaminepolyether which is an adduct of an oxirane compound to a polyamidepolyamine, the polyamidepolyamine being a condensate of a polyamine and an organic carboxylic acid; or a mixture of the polyaminepolyetherpolyester and the polyamidepolyaminepolyether.

2. The coating composition as claimed in claim 1, wherein the composition contains the blocked polyisocyanate or polyurethane prepolymer and, either the polyaminepolyetherpolyester, polyamidepolyaminepolyether or a mixture of these in equivalent ratios of the blocked polyisocyanate groups to the reactive hydrogens in the polyaminepolyetherpolyester or polyamidepolyaminepolyether of about 0.1 to 10.

3. The coating composition as claimed in claim 1, wherein the oxirane compound is an alkylene oxide.

4. The coating composition as claimed in claim 1, wherein the polyamine compound is an alkylenediamine or a polyalkylenepolyamine.

5. A low temperature curable polyurethane coating composition which comprises:
   (a) an aromatic polyisocyanate blocked with an oxime or an aromatic polyurethane prepolymer having terminal isocyanate groups blocked with an oxime;
   (b) a polyaminepolyetherpolyester which is a condensate of a polyaminepolyether and an organic carboxylic acid, the polyaminepolyether being an adduct of ethylene oxide or tetrahydrofuran to a polyamine compound, a polyamidepolyaminepolyether which is an adduct of ethylene oxide or tetrahydrofuran to a polyamidepolyamine, the polyamidepolyamine being a condensate of a polyamine and an organic carboxylic acid; or a mixture of the polyaminepolyetherpolyester and the polyamidepolyaminepolyether.

6. The coating composition as claimed in claim 5, wherein the composition contains the blocked aromatic polyisocyanate or aromatic polyurethane prepolymer and, either the polyaminepolyetherpolyester, polyamidepolyaminepolyether or a mixture of these in equivalent ratios of the blocked polyisocyanate groups to the reactive hydrogens in the polyaminepolyetherpolyester or polyamidepolyaminepolyether of about 0.1 to 10.

7. The coating composition as claimed in claim 5, wherein the polyamine compound is an alkylenediamine or a polyalkylenepolyamine.

8. The coating composition as claimed in claim 5, wherein the composition is curable at temperatures of about 90°–110° C.

* * * * *